Figure 1:
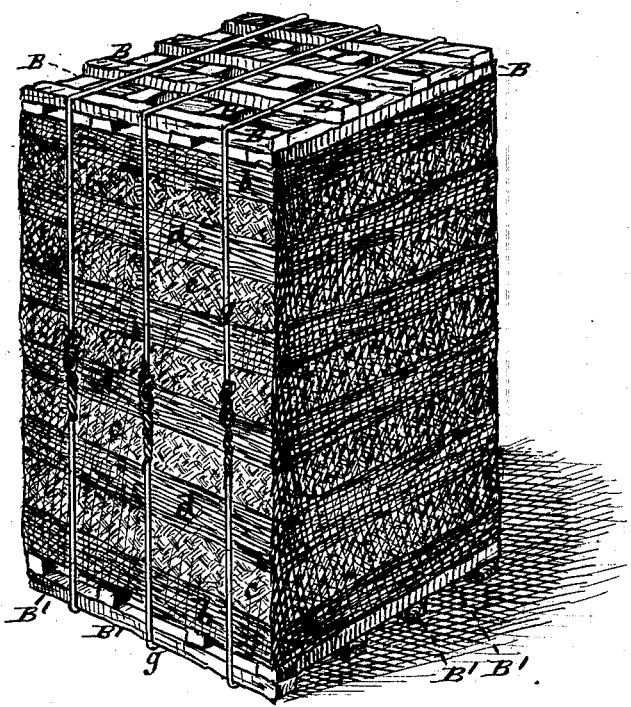

C. BROWN.
Hay and Feed Bale.

No. 197,597. Patented Nov. 27, 1877.

Witnesses
John Becker
Fred Haynes

Inventor Charles Brown
by his Attorneys
Brown & Allen

UNITED STATES PATENT OFFICE.

CHARLES BROWN, OF NEW YORK, N. Y.

IMPROVEMENT IN HAY AND FEED BALES.

Specification forming part of Letters Patent No. 197,597, dated November 27, 1877; application filed February 12, 1877.

*To all whom it may concern:*

Be it known that I, CHARLES BROWN, of the city, county, and State of New York, have invented certain new and useful Improvements in Hay and Feed Bales, of which the following is a description, reference being had to the accompanying drawing, forming part of this specification.

One of the objects of this invention is to combine, in one and the same bale, long hay, cut hay, and ground feed or whole grain.

Prior to describing my invention, I would remark that my attention has been specially directed to the importance of a mixed bale, as above, by the following facts: After many years of observation and experience in the care, use, and feeding of horses, I have found that a very prolonged or continuous feeding of these animals with short-cut hay produces serious results. Thus, the sharp ends of the stalks or spears of the cut hay wound and irritate the coats of the horse's stomach to such an extent as to weaken and eventually destroy the digestive powers of the animal. This result is mainly due to the animal swallowing the cut hay in an unmasticated condition. Were it not for this fact, cut hay would be more highly esteemed and come into more general use as a feed for horses.

My invention removes this objection to the continuous or too free use of cut hay, by combining in the same bale long hay, cut hay, and ground feed or whole grain, as follows.

Thus the invention consists in a pressed bale of hay and feed composed of long hay, cut hay, and ground feed or whole grain combined, without restriction to any particular order or to the relative quantities of said ingredients.

The invention also consists in a pressed bale of long hay, cut hay, and ground feed or whole grain, without restriction to relative proportions or quantities, in which said ingredients are separated in mass one from the other.

The invention furthermore consists in a pressed bale of hay and ground feed or whole grain in which the ground feed or whole grain, separately massed within the bale, is surrounded or inclosed by alternate layers of long hay and cut hay, without restriction to relative proportions or quantities of the several ingredients.

This latter modification is the one that will here be selected to illustrate my invention, and by the use of it the feeders of horses can take such quantities of the different and separated ingredients of the bale as they may desire to mix for a feed, and to vary these quantities or relative proportions of the several ingredients, each feed according to the work done by or condition of the animal. Such mixed bale also dispenses with the cost and use of bags, as ordinarily employed, in handling ground feed or grain.

Again, the invention consists in a novel mode of binding pressed hay and feed bales, whereby the crowning of the bale and its liability to topple over is reduced.

Figure 2:
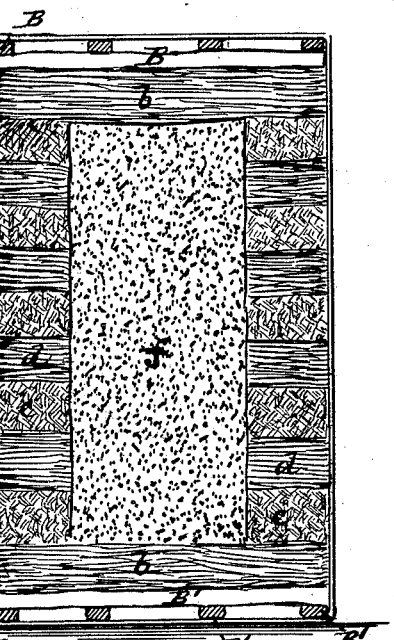
Figure 3:
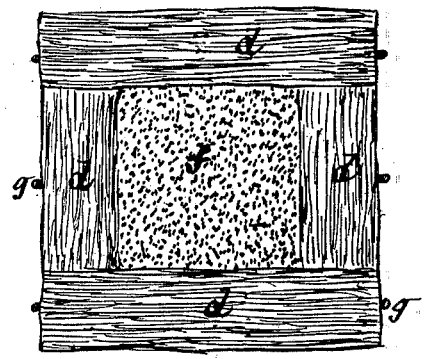

In the accompanying drawings, Figure 1 represents a view, in perspective, of a hay and feed bale put up in accordance with my invention; Fig. 2, a vertical or longitudinal section thereof, and Fig. 3 a transverse section of the same.

In putting up the bale shown in the drawing, I take, for instance, any hay-press of good construction, and lay on the bottom of its box either of the covers or sets of sticks B or B′, and on this cover put a thin layer, *b*, of either long or cut hay. I then place in the press-box, and on the top and in the center of this thin layer of hay, a core or former, which may be of corresponding configuration with the bale to be produced, but is smaller than it, and extends up the entire length of the press-box. I next fill into the press-box, and around this core or former, alternate layers of long and cut hay, *d c*, until a sufficient quantity of these layers is in the press-box to make the required bale. After this core or former is withdrawn, a hollow or unfilled space is left through the center and length of the combined layers *d c* of long and cut hay. This space I fill with ground feed or whole grain, *f*, and then put on or over it another thin layer, *b*, of either long or cut hay, and afterward, on top of the combined mass, place the other cover or sets of stick B or B′. The cover of the press is then put in place, and power applied to the press to compress into a firm and compact bale the whole combined mass of long hay, cut hay, and ground feed or whole grain, without destroying the relative and separate arrangement of the several ingredients of the bale, the walls of which are composed of the hay, and serve to retain the ground feed or whole grain in place. While thus under pressure, said bale, with its end covers, is secured by any suitable bale bands or ties, $g$.

Instead of the ground feed or whole grain $f$ being put into the bale loose, as shown in the drawing, it may be inclosed in a long bag of paper or other material, and this be put in the center of the press-box, and the space around the bag be filled in with alternate layers of long and cut hay.

The covers B B' are each composed of duplicate layers of three or more sticks each, said layers of sticks crossing each other at right angles, or thereabout. The object of this arrangement of simple sticks is to prevent or check crowning of the bale, so as to admit of the bale being stood on end without much or any liability of its toppling over. The bands $g$ prevent or check the outer sticks of the covers from bending, and the outer sticks prevent or check the inner sticks from bending.

I claim—

1. A pressed bale of long hay, cut hay, and ground feed or whole grain, combined, in which said component parts or ingredients are separated in mass one from the other, essentially as specified.

2. A pressed bale of hay and ground feed or whole grain combined, but separately massed, and in which the ground feed or whole grain is surrounded or inclosed by alternate layers of long hay and cut hay, essentially as shown and described.

CHARLES BROWN.

Witnesses:
  BENJAMIN W. HOFFMAN,
  FRED. HAYNES.